United States Patent [19]

Sommerfeld et al.

[11] Patent Number: 4,735,970
[45] Date of Patent: Apr. 5, 1988

[54] PROCESS FOR THE PRODUCTION OF A CELLULAR POLYURETHANE

[75] Inventors: Claus-Dieter Sommerfeld, Much; Werner Rasshofer, Cologne, both of Fed. Rep. of Germany

[73] Assignee: Bayer Aktiengesellschaft, Leverkusen, Fed. Rep. of Germany

[21] Appl. No.: 20,622

[22] Filed: Mar. 2, 1987

[30] Foreign Application Priority Data

Mar. 11, 1986 [DE] Fed. Rep. of Germany ....... 3607964

[51] Int. Cl.$^4$ ............................................. C08G 18/14
[52] U.S. Cl. .................................... 521/128; 252/182; 502/167; 521/129; 521/131
[58] Field of Search ......................... 252/182; 502/167; 521/128, 129, 131

[56] References Cited

U.S. PATENT DOCUMENTS 4,077,920 3/1978 Yukuta et al. ...................... 260/2.5
4,500,656 2/1985 Rasshofer et al. .................. 521/164

FOREIGN PATENT DOCUMENTS 1570571 7/1969 Fed. Rep. of Germany.
2200480 7/1972 Fed. Rep. of Germany.

OTHER PUBLICATIONS

Peter Fabian, "Die Naturwissenschaften" 67, 1980, pp. 109–120.
Colin R. Patrick, "Journal of Fluorine Chemistry, 25", 1984, pp. 7–15.
Dr. A. Smola, "Mitteilungen der Chemischen Forschungsinstituts der Wirtschaft Osterichs", 1948, pp. 38–40 and pp. 43–45.

Primary Examiner—M. J. Welsh
Attorney, Agent, or Firm—Gene Harsh; Joseph C. Gil; Thomas W. Roy

[57] ABSTRACT

The present invention is directed to a process for preparing a cellular polyurethane by reacting with an NCO-reactive component in the presence of a homogeneous mixture of an optionally water-containing adduct of carbon dioxide an amine containing at least one secondary amino group, low primary amino groups and at least one primary or secondary hydroxyl group (provided there are not more primary hydroxyl groups than amino groups), an amine catalyst and optionally monofluorotrichlormethane. The present invention is directed to the homogeneous mixture these three components.

12 Claims, No Drawings

PROCESS FOR THE PRODUCTION OF A CELLULAR POLYURETHANE

BACKGROUND OF THE INVENTION

1. Field of the Invention

This invention relates to a process for the production of cellular polyurethanes using special amine-carbon dioxide adducts and to homogeneous mixtures of these adducts, optionally with monofluorotrichloromethane.

2. Description of the Prior Art

The process known among experts as "frothing" has been successfully used in the production of foams, particularly rigid foams, based on polyurethanes. In the frothing process, the reaction mixture is prepared in such a way that it actually enters the mold cavity in the form of a creamy foam. The advantage of this lies in the stable, continuous flow front which guarantees high surface quality. The need to include a blowing agent, which frequently causes swelling in the end product, is avoided.

This process is used in particular for certain refrigerator constructions and for large, heavily insulated refrigerators where the still foaming liquid reaction mixture is able to flow out from leaks in the cabinet which can necessitate expensive finishing work.

The frothing effect is obtained, for example, by addition of a low-boiling blowing agent, such as difluorodichloromethane or a mixture of monofluorotrichloromethane and difluorodichloromethane.

For example, in a standard commercial rigid foam of the type used for insulating refrigerating cabinets, if part of the monofluorotrichloromethane blowing agent (boiling point +23.7° C.) is replaced by dichlorodifluoromethane (R 12, boiling point −29.8° C.) and if the dichlorodifluoromethane is introduced into the polyol under pressure in liquid form, the reaction mixture emerges from the mixing head of the proportioning machine in creamy, prefoamed form through spontaneous evaporation of the R 12. In this form, the reaction mixture is unable to flow out from leaks in the refrigerator cabinet.

Unfortunately, the frothing process is by no means a universal solution to sealing problems. Once the foaming reaction mixture has filled the walls of the refrigerator cabinet, it is able to flow out from leaks, despite frothing, because of the foaming pressure. The flowing agents or blowing agent mixtures in question are difficult to process because their boiling points are below 0° C. and because they have to be supplied in pressure cylinders. Proportioning the blowing agents through pumps of any type involves problems because the stoichiometric ratios involved have to be carefully maintained, which is very difficult when high-performance piston pumps are used due to leaks.

The frothing effect may also be obtained by the addition of large amounts of gas. For example, an expanded gas (such as air or nitrogen) is introduced into the polyol component in a quantity of about 0.4 to about 0.8 g per liter of polyol. Similar problems are involved here. Proportioning of the gas is carried out with flow meters and, accordingly, is inaccurate. The gas has to be very finely dispersed in the component because when the usual high pressure pumps are used for proportioning, it is only by intensive mixing that the required effects can be obtained. Further the mixture of gas and polyol component has to be kept under such high pressure that no proportioning errors are produced by the gas bubbles mixed in.

It has also been found that if the proportion of monofluorotrichloromethane which boils at 23.5° C. is reduced and replaced by difluorodichloromethane or gas, the quality of the outer skin is seriously affected both in hardness and in thickness.

In addition, fluorinated hydrocarbons have been criticized by ecologists, for example by P. Fabian, Die Naturwissenschaften 67 (1980), pages 109 to 120, and C. R. Patrick, J. Fluorine Chem. 25 (1984), pages 7 to 15.

Accordingly, an object of the present invention is to provide a process for the production of rigid polyurethane foams by frothing which is not attended by any of the disadvantages of conventional processes and which (a) may be carried out both in fixed industrial installations and also in situ using small mobile units, (b) has physiological advantages over conventional processes using dichlorodifluoromethane and (c) combines high operational reliability with improved handling.

According to the invention, these objects are achieved by the use of a special alkanolamine-$CO_2$ adduct and/or alkanolamine -$CO_2$-water adduct in combination with a tertiary amine catalyst and optionally monofluorotrichloromethane in the form of a homogeneous mixture as blowing agent.

The use of carbon dioxide adducts of hydroxylamines in the production of polyurethanes is known. DE-OS No. 2,200,480 mentions the use of ethanolamine carbamate in a process for the production of a cellular PU-elastomer; however, this prior publication does not state whether the ethanolamine carbamate is solid or liquid. In addition, it is apparent from DE-PS No. 2,621,582 that carbamates, which are reaction products of primary or secondary amines containing 1 or 2 hydroxyl groups with carbon dioxide, are solid or may be obtained in solid form if they are prepared by introduction of carbon dioxide into alcohols or other solvents and cannot be homogeneously mixed in a single phase, even with a polyol. It is not apparent from this publication that the carbon dioxide adducts in question are liquid at room temperature or may be obtained in liquid form.

Liquid carbamates of compounds containing amino groups are described in DE-OS No. 1,570,571. However, these amines are limited to diamines or polyamines containing ether groups in which about 0.01 to 50% of the amino groups may be replaced by a hydroxyl group. However, the amines preferably used are high molecular weight amines with, in general, only a small content of basic nitrogen and amino groups often present as secondary nitrogen atoms which only allow a low uptake of carbon dioxide.

The use of the products according to DE-OS No. 2,200,480 and DE-PS No. 2,621,582 for the production of polyurethane foams is also known.

According to DE-OS No. 2,200,480, the amine carbamates generally loose their thermal stability and decompose at temperatures above about 35° C. The same teaching can be found in DE-OS No. 1,570,571, in that the amines in question may only be converted into carbamates by reaction with $CO_2$ at −40° to +40° C. and preferably at 0 to 20° C. The carbamates prepared by way of example in this prior publication largely decompose at temperatures as low as room temperature or 30° C..

According to EP No. 121,850, carbon dioxide adducts of monoamines or polyamines containing one or more hydroxyalkyl groups (the amino groups may be primary, secondary and/or tertiary amino groups and may be substituents or chain members in acyclic or cyclic aliphatic parent compounds) are obtained in liquid form and remain in liquid form without crystallizing provided they are prepared by the addition of amines containing hydroxyl groups to carbon dioxide and, optionally water. The adducts thus prepared are said to be homogeneously soluble in the polyols normally used for the production of polyurethanes, especially those having a functionality of greater than 2 and a molecular weight of 60 to 2000.

EP No. 121,850 also teaches that not only carbamates (i.e., ammonium salts of alkylcarbamate acids), but also carbonic acid salts (formed by carrying out the reaction of the polyamines containing hydroxyl groups with carbon dioxide in the presence of water) and mixtures thereof are liquid. The differences between carbamates as salts of carbamic acid and carbonates or hydrogen carbonates as salts of carbonic acid are well known and described for example, in A. Smola, Mitteilungen der Chemischen Forschungsinstituts der Wirtschaft Osterreichs 2, 38–40 and 43–45 (1948) (Chemical Abstracts 43 (1949), 6157 h).

However, it has been found that many of these products cannot be stored with trichlorofluoromethane or stored for prolonged periods in the polyol component without suffering a distinct reduction in reactivity.

Accordingly, a particular object of the present invention is to provide a process in which trichlorofluoromethane and an aminoalcohol-$CO_2$ adduct can be stored together without any substantial change in reactivity and without the need for stabilizer or other known auxiliary.

SUMMARY OF THE INVENTION

The present invention is directed to a process for the production of a cellular polyurethane by reacting
  (A) a polyisocyanate with
  (B) an NCO-reactive component containing
    (1) a compound containing at least one NCO-reactive group and having a molecular weight of 60 to 1999 and a functionality of from 2 to 8,
    (2) optionally a compound containing at least one NCO-reactive group and having a molecular weight of 2000 to about 12,000 and a functionality of from 2 to 8, in the presence of a homogeneous mixture containing, based on 100 parts by weight B 1.+B 2.,
    (3) about 0.05 to 25 parts by weight of an optionally water-containing adduct of carbon dioxide with an amine containing at least one secondary amino group, no primary amino groups and at least one primary or secondary hydroxyl group provided there are not more primary hydroxyl groups than amino groups, and
    (4) about 0.05 to 25 parts by weight of an amine catalyst, and optionally
    (5) up to about 50 parts by weight of monofluorotrichloromethane, optionally in the presence of
  (C) water and/or further inorganic or organic blowing agents, foam stabilizers and other additives usual in the production of cellular polyurethanes.

The present invention is also directed to a homogeneous mixture containing components B 3., B 4., and B5.

DETAILED DESCRIPTION OF THE INVENTION

In a preferred embodiment of the process, the amine-carbon dioxide adduct is obtained by the reaction of carbon dioxide with an amine at temperatures of −25° C. to +160° C., optionally in the presence of water and/or polyols containing 2 to 8 hydroxyl groups and having an OH number above 112 wherein the reaction is conducted in the absence of the following solvents: optionally halogenated aliphatic hydrocarbons, optionally nitrated, halogenated or alkylated aromatic hydrocarbons, low molecular weight aliphatic alcohols, acid amides, lactams and aprotic-polar solvents.

According to the invention, a preferred amine-carbon dioxide adduct is one which
  (a) has a basic nitrogen content of about 3.5 to 17.5% by weight, preferably about 3.5 to 12% by weight,
  (b) a hydroxyl group content of about 8.5 to 23% by weight, preferably about 8.5 to 14.5% by weight,
  (c) a carbon dioxide content of about 1 to 37% by weight, preferably about 2.5 to 37% by weight and
  (d) a water content of 0 to 15% by weight.

In another preferred embodiment of the process according to the invention, optionally modified toluene diisocyanates or phosgenation products of formaldehydeaniline condensates are used as the polyisocyanates and polyethers containing from 3 to 6 hydroxyl groups and having a molecular weight of about 200 to 1000 are used as component B 1.

A particularly preferred carbon dioxide-amine adduct is the optionally water-containing $CO_2$-adduct of N-methyl-2-aminoethanol.

The frothing process is advantageously used in accordance with the invention.

It is particularly surprising that mixtures of $CFCl_3$ with the $CO_2$-adducts of aminoalcohols containing secondary amino groups are more stable in storage than mixtures of $CFCl_3$ with $CO_2$-adducts of aminoalcohols containing primary amino groups. Dichloromethane for example is known to have precisely the opposite effect, cf. for example J. E. Mills et al., Org. Prep. Proced. Int. 16 (1984), 97–114.

The process according to the invention affords the following advantages:

1. Replacement of part of the fluorochlorinated hydrocarbon by carbon dioxide which is less harmful to the enviroment.

2. Storable formulation of trichlorofluoromethane and aminoalcohol-$CO_2$ adduct without any need for stabilizers.

3. Very good foaming properties which are superior to the prior art with regard to flow, sealing of leaks and production reliability. The bubble formation observed when dichlorofluoromethane is used as frothing agent no longer occurs.

4. The aminoalcohol-$CO_2$ adducts act favorably as co-catalysts. They are incorporated and thus contribute towards reducing the odor level of the foam sections. The combination of t-amine catalyst and aminoalcohol adduct satisfies the following requirements: negligible odor emission, immediate initial foaming, complete foaming and rapid hardening.

5. The absence of blowing agents boiling at temperatures below 20° C. provides for technical simplifications because the polyol component no longer has to be stored under pressure. This also applies to in situ frothing.

6. No danger of unwanted change of index by intentional and/or premature evaporation of the low-boiling blowing agent.

The following materials may be used in the process according to the invention.

Component A includes aliphatic, cycloaliphatic, araliphatic, aromatic and heterocyclic polyisocyanates of the type described, for example, by W. Siefken in Justus Liebigs Annalen der Chemie, 562, pages 75 to 136, for example those corresponding to the formula $$Q(NCO)_n$$

in which n=2 to 4, preferably 2 and

Q is an aliphatic hydrocarbon radical containing 4 to 18, preferably 6 to 10 carbon atoms: a cycloaliphatic hydrocarbon radical containing 4 to 15, preferably 5 to 10 carbon atoms: an aromatic hydrocarbon radical containing 6 to 15, preferably 6 to 13 carbon atoms; or an araliphatic hydrocarbon radical containing 8 to 15, preferably 8 to 13 carbon atoms.

Examples include 1,6-hexamethylene diisocyanate, 1,12-dodecane diisocyanate, cyclohexane-1,3- and -1,4-diisocyanate and mixtures of these isomers, 1-isocyanato-3,3,5-trimethyl-5-isocyanatomethylcyclohexane (DE-AS 1,202,785, US-PS 3,401,190), 2,4- and 2,6-hexahydrotoluene diisocyanate and mixtures of these isomers, hexahydro-1,3- and/or -4,4'-diphenylmethane diisocyanate, 1,3- and 1,4-phenylene diisocyanate, 2,4- and 2,6-toluene diisocyanate and mixtures of these isomers, diphenylmethane-2,4'- and/or -4,4'-diisocyanate and naphthylene-1,5-diisocyanate.

Further examples of polyisocyanates which may be used in accordance with the invention are described in DE-OS No. 3,312,215, pages 19 to 21 (U.S. Pat. No. 4,500,656, herein incorporated by reference in its entirety, at column 7).

Aromatic polyisocyanates are preferably used, particularly preferred are the commercially available polyisocyanates such as 2,4- and 2,6-toluene diisocyanate and mixtures of these isomers ("TDI"), polyphenylpolymethylene polyisocyanates of the type obtained by phosgenating aniline-formaldehyde condensates ("crude MDI") and polyisocyanates containing carbodiimide groups, urethane groups, allophanate groups, isocyanurate groups, urea groups or biuret groups ("modified polyisocyanates"), particularly those modified polyisocyanates which are derived from 2,4- and/or 2,6- tolylene diisocyanate.

Starting component B 1 includes compounds containing at least two isocyanate reactive hydrogen atoms and generally having a molecular weight of from about 60 to 1999. These include compounds containing amino groups, thiol groups or carboxyl groups or preferably hydroxyl groups, in particular from 2 to 8 hydroxyl groups, especially those with molecular weights of from about 200 to 1000, preferably from about 300 to 800, e.g. polyesters, polyethers, polythioethers, polyacetals, polycarbonates and polyester amides having at least 2, generally 2 to 8, preferably 2 to 6 hydroxyl groups, such as the known compounds used for the preparation of both homogeneous and cellular polyurethanes. Polyether polyols are particularly preferred.

The hydroxypolyethers containing at least 2, generally 2 to 8, preferably 2 to 6 hydroxyl groups, which may also be used according to the invention and are in fact preferred, are known per se and may be prepared, for example, by the polymerization of epoxides such as ethylene oxide, propylene oxide, butylene oxide, tetrahydrofuran, styrene oxide or epichlorohydrin either on their own, e.g. in the presence of Lewis catalysts such as $B_F$ or by their chemical addition, preferably the addition of ethylene oxide and propylene oxide, optionally as mixtures or successively, to starting components containing reactive hydrogen atoms, such as water, alcohols, ammonia or amines, for example the following: ethylene glycol, propylene glycol-(1,3) and (1,2), trimethylolpropane, glycerol, sorbitol, mannitol, quinitol, trimethylolethane, pentaerythritol, hexanetriol-(1,2,6), 4,4'-dihydroxy-diphenylpropane, aniline, ethanolamine or ethylene diamine. Sucrose polyethers such as those described, for example, in German Auslegeschriften Nos. 1,176,358 and 1,064,938 and polyethers started on formitol or formose (German Offenlegungsschriften Nos. 2,639,083 and 2,737,951) may also be used according to the invention. It is frequently preferred to use polyethers containing predominantly primary OH groups (up to about 90% by weight thereof, based on all of the OH groups in the polyether).

Other suitable compounds are described in detail in DE-OS No. 3,312,215, pages 21 to 37, (U.S. Pat. No. 4,500,656, columns 8–14).

Compounds belonging to component B 2 include polyether polyols obtained from the units described above, provided they have molecular weights of 2000 or greater and polyesters, polybutadienes, polythioethers, polyacetals, polycarbonates, polyester amides and polyamides of known type containing OH, NH and/or SH groups provided they have molecular weights of 2000 or greater and the other types of compounds mentioned in DE-OS No. 3,312,215 (U.S. Pat. No. 4,500,656) provided they have molecular weights above 2000.

Component B 3. includes the amine-carbon dioxide adducts which are liquid, but preferably solid, at 20° C. and obtained by the action of carbon dioxide on amines, optionally in the presence of water, at temperatures of about −25° C. to 160° C., preferably about 0° to 130° C. and most preferably about 15° to 100° C. The reaction is conducted in the absence of the following solvents: optionally halogenated, aliphatic hydrocarbons, optionally nitrated, halogenated or alkylated aromatic hydrocarbons, lower aliphatic alcohols, acid amides, lactams and aprotic-polar solvents such as ketones, ethers, nitriles, N-substituted acid amides or N-substituted lactams. By contrast, solvents which may optionally be used are polyols containing from 2 to 8 hydroxyl groups and having an OH number above 112 or amine catalysts of the type also used as component B 5. However, it is preferred not to use a solvent; water in this context is not a solvent.

The optionally water-containing amine-carbon dioxide adducts which are liquid, but preferably solid, at 20° C. generally have (a) a basic nitrogen content of about 17.5 to about 3.5% by weight, (b) a hydroxyl group content of about 23 to about 8.5% by weight, (c) A carbon dioxide content of about 37 to about 1.0% by weight and (d) a water content of about 3 to about 15% by weight.

The following are examples of compounds (B 3.) containing at least one primary, secondary or tertiary hydroxyl group (provided that there are not more primary hydroxyl groups than amino groups, preferably at most one primary hydroxyl group although other hydroxyl groups may be present and most preferably one hydroxyl group), no primary amino groups and at least one secondary amino group which may be used in the production of the carbon dioxide adducts: monoaminomono- or -dihydroxy compounds containing secondary amino groups such as N-methyl-2-amino-ethanol, N-ethyl-2-aminoethanol and 2-(2-N-methyl-aminoethyl)-1,2-ethane diol. Bis-(hydroxyalkyl)-diamines obtained from corresponding straight-chain or branched-chain aliphatic or cycloaliphatic diamines by alkoxylation with alkylene oxides, preferably ethylene oxide and/or propylene oxide, are also suitable. Examples include N,N'-bis-($\beta$-hydroxyethyl)-ethylenediamine, N,N'-bis-($\beta$-hydroxypropyl)-ethylenediamine, N,N'-bis-($\beta$-hydroxyethyl)-1,2-propylenediamine, N,N'-bis-($\beta$-hydroxypropyl)-1,3-propane diamine, N,N'-bis-($\beta$-hydroxyethyl)-1-methyl-2,4- and -2,6-diaminocyclohexane, N,N'-bis-($\beta$-hydroxypropyl)-p-xylylene diamine and N-($\beta$-hydroxyethyl)-N'-($\beta$-hydroxypropyl)-ethylenediamine. It is also possible to use alkoxylated tri- and polyamines, for example, tris-($\beta$-hydroxyethyl)-1,6,11-triaminoundecane.

Amines which are solid or liquid at room temperature and preferably used for the production of the optionally water-containing amine-carbon dioxide adducts are those amine compounds which may be obtained (a) by reaction of ammonia with 1 mole ethylene or propylene oxide, (b) by reaction of $C_1$–$C_4$-alkylamine with 1 mole ethylene or propylene oxide or (c) by reaction of 1,2-ethylene or propylenediamine with 2 moles ethylene oxide or propylene oxide.

Highly preferred amines include N-methyl-2-aminoethanol, N-methyl-2-amino-1-propanol, N-methyl-3-amino-1-propanol and N-ethyl-2-aminoethanol. The most preferred amine for the process according to the invention in its preferred embodiment (co-use of trichlorofluoromethane) is N-methyl-2-aminoethanol.

These amines containing hydroxyl groups are converted into carbon dioxide adducts by the action of carbon dioxide. So-called carbamates which are ammonium salts of alkylcarbamic acids are formed in the absence of water. If stoichiometric or larger quantities (based on the amine) of water are used, carbonic acid salts of the particular amine compounds are obtained. In the presence of water in a quantity below the quantity required for complete carbonic acid salt formation, the corresponding mixtures of carbamates and (hydrogen) carbonates are formed. The reaction is carried out in the absence of the following solvents: optionally halogenated aliphatic hydrocarbons, optionally nitrated, halogenated or alkylated aromatic hydrocarbons, lower aliphatic alcohols, aprotic-polar solvents, acid amides and lactams at temperatures of about $-25°$ C. to $+160°$ C., preferably about 0° to 130° C. and more preferably 15° to 100° C. By contrast, solvents which may optionally be used are polyols containing from 2 to 8 hydroxyl groups and having an OH number above 112 or amine catalysts of the type also used as component B 5., although it is preferred not to use a solvent; water in this context is not a solvent.

The observations made concerning the heat of reaction and the reaction temperature limits to be maintained apply to the production of both the carbamates and the carbonic acid salts. In the case of the carbonic acid salts, however, it is important to remember that the mere combination of amine and water generates considerable heat. The temperatures occurring during the treatment with carbon dioxide are on average below those occurring in the production of the carbamates.

The carbon dioxide adducts are clear, low-viscosity liquids or crystalline solids which are generally light in color and stable. They are generally soluble in polar media such as methanol ethanol, dimethylformamide, acetonitrile, dimethylsulfoxide, sulfolan, etc. or in low molecular weight polyols having OH numbers of 200 to 1800 of the type obtained by addition of ethylene oxide for example onto glycerol or trimethylol propane. However, they are stable in storage, even in the polyol mixture, in quantities of up to about 50% by weight and dissolve clearly to form single-phase solutions of the type used, for example, for the production of rigid polyurethane foam. In the production of cellular polyurethanes in accordance with the invention, they act as blowing agent, crosslinking agent and catalyst.

The adducts B 3. are used in a quantity of about 0.1 to 30 parts, preferably about 0.15 to 15 parts and more preferably about 0.2 to 2.99 parts, based on 100 parts of B 1.+B 2.

The adducts may be produced with any form of carbon dioxide, although unpurified carbon dioxide from steel cylinders is preferably used. In addition, the adducts may be prepared under reduced pressure or excess pressure, but preferably under normal pressure. The temperatures at which they may be prepared generally extend from about $-25°$ C. to the boiling points of the particular amines, provided they boil below 200° C. under normal pressure, otherwise to approximately $+160°$ C.

A narrower, preferred range is about 0° to 130° C., the range of about 15° to 100° C. being particularly preferred. In this embodiment, which is preferred, the adducts may be prepared by vigorously introducing carbon dioxide without cooling and without external heating into the amine accommodated in a suitable vessel, optionally with a suitable quantity of water added. The reaction generally begins immediately and is accompanied by considerable evolution of heat such that the temperature of the mixture rises quickly to about 40 to 130° C.. Towards the end of the reaction, there is a distinct reduction in the temperature. In the event of a marked increase in the internal temperature, for example to 100° C., caused by exothermic reaction, the reaction vessel is preferably cooled externally in order to counteract secondary reactions (for example cyclization) and discoloration occurring at excessive temperatures.

It is also possible to heat the amine or the amine/water mixture to elevated temperature from the outset and only then to introduce $CO_2$. However, it is of no advantage, although possible, to keep the reaction temperatures at $-40$ to $+40°$ C., as described in DE-OS No. 1,570,571. In many cases, higher temperatures are even advisable for improving stirability.

The blowing agent (B 5.) used is trichlorofluoromethane. It is optionally used in quantities up to 50 parts, preferably in quantities of about 0.5 to 50 parts, based on 100 parts of B 1.+B 2.

In addition, amine catalysts (B 4.) are used. Examples include tertiary amines such as triethylamine, tributylamine, N-methylmorpholine, N-ethylmorpholine, N,N,N',N'-tetramethylethylenediamine, pentamethyl diethylenetriamine and higher homologs (DE-OS No. 2,624,527 and 2,624,528), 1,4-diazabicyclo-(2,2,2)-octane, N-methyl-N'-dimethylaminoethylpiperazine, bis-(dimethylaminoalkyl)-piperazines (DE-OS, No. 2,636,787), N,N-dimethylbenzylamine, N,N-dimethylcyclohexylamine, N,N-diethylbenzylamine, bis-(N,N-diethylaminoethyl)- adipate, N,N,N',N'-tetramethyl-1,3-butane diamine, N,N-dimethyl-$\beta$-phenylethylamine, 1,2-dimethylimidazole, 2-methylimidazole, monocyclic and bicyclic amidines (DE-OS No. 1,720,633), bis-(dialkylamino)-alkylethers (U.S. Pat. No. 3,330,782, DE-AS No. 1,030,558 and DE-OS No. 1,804,361 and No. 2,618,280) and tertiary amines containing amide groups (preferably formamide groups) according to DE-OS No. 2,523,633 and No. 2,732,292). Other suitable catalysts include Mannich bases of secondary amines such as dimethylamine; aldehydes, preferably formaldehydes; ketones such as acetone, methylethylketone or cyclohexanone; and phenols such as phenol, nonylphenol or bisphenol.

Tertiary amines containing isocyanate-reactive hydrogen atoms suitable for use as catalysts include triethanolamine, triisopropanolamine, N-methyldiethanolamine, N-ethyldiethanolamine, N,N-dimethylethanolamine, reaction products thereof with alkylene oxides such as propylene oxide and/or ethylene oxide, and also secondary-tertiary amines according to DE-OS No. 2,732,292:

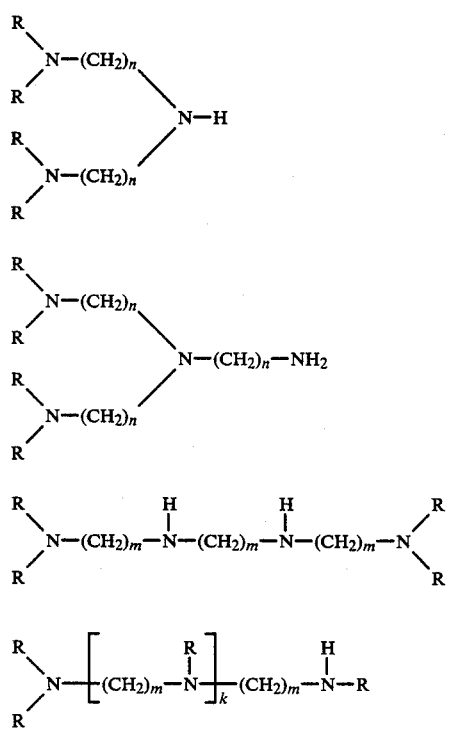

in which the substituents R, independently of one another, are optionally branched alkyl groups containing from 1 to 4 carbon atoms, the numbers n, independently of one another, are 2 or 3, the numbers m, independently of one another, are 2 or 3 and K is an integer of from 1 to 5, and formulation products and ureidization products thereof.

The following are examples of the preferred amine catalysts:

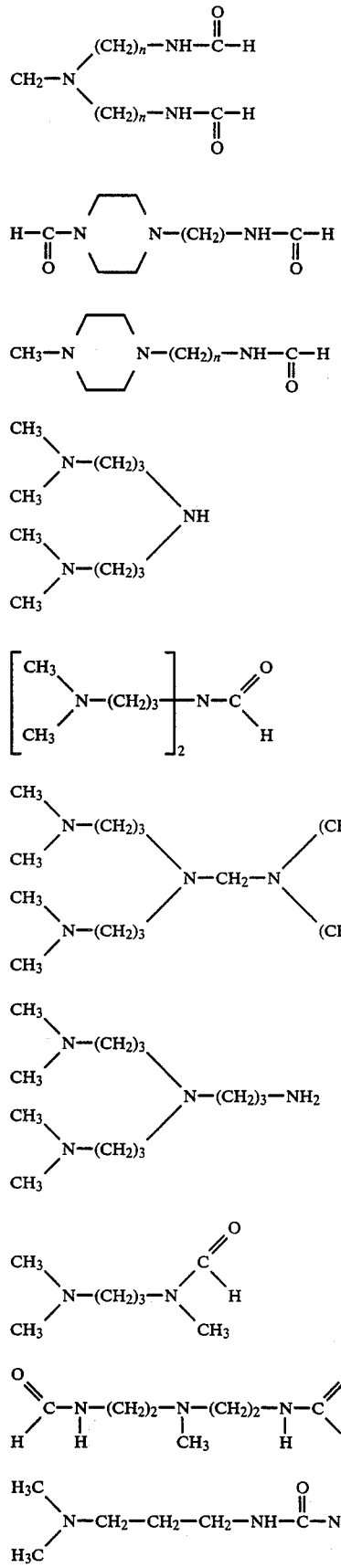

-continued

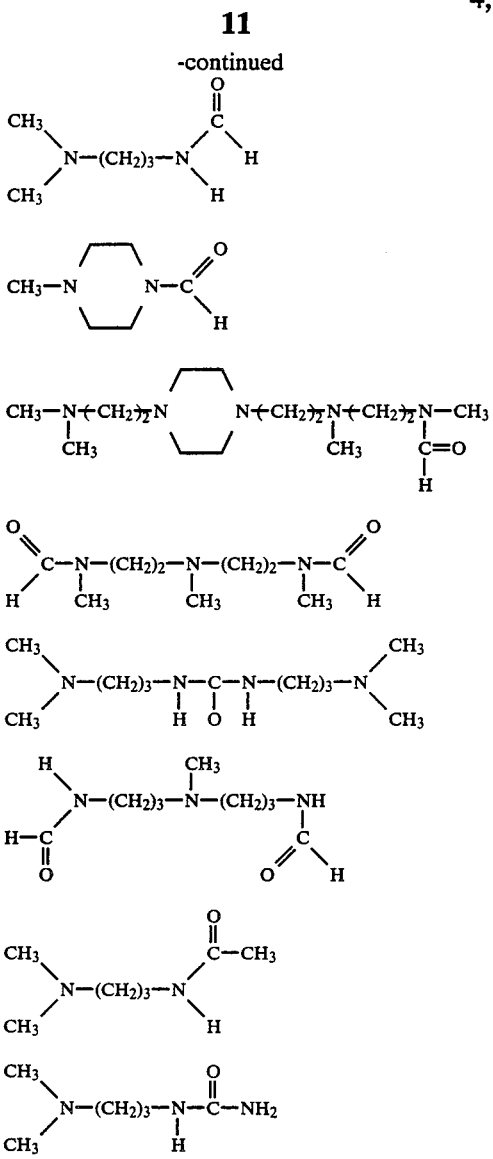

Particularly preferred catalysts are N,N-dimethylaminopropyl formamide and N-methylimidazole.

Other suitable catalysts are silaamines containing carbon-silicon bonds of the type described, for example, in DE-PS No. 1,229,290 (corresponding to U.S. Pat. No. 3,620,984), such as 2,2,4-trimethyl-2-silamorpholine and 1,3-diethylaminomethyl tetramethyldisiloxane.

Other suitable auxiliaries and additives (component C)) which may optionally be used include water and/or additional readily volatile inorganic or organic compounds as additional blowing agents. Organic blowing agents include acetone, ethylidene chloride, vinylidene chloride, chlorodifluoromethane, dichlorodifluoromethane. Examples of inorganic blowing agents include air, $CO_2$, or $N_2O$. Further examples of blowing agents and information on the use of blowing agents can be found in Kunststoff-Handbuch, Vol. VII, edited by Vieweg and Hochtlen, Carl-Hanser-Verlag, Munich 1966, for example on pages 108 and 109, 453 to 455 and 507 to 510.

Other suitable catalysts are nitrogen-containing bases such as tetraalkylammonium hydroxides; alkali hydroxides such as sodium hydroxide; alkali phenolates such as sodium phenolate; and alkali alcoholates such as sodium methylate. Hexahydrotriazines may also be used as catalysts (DE-SO No. 1,769,043).

The reaction between NCO-groups and Zerewitinoff-active hydrogen atoms is also greatly accelerated by lactams and azalactams, in which case an associate between the lactam and the compound containing acidic hydrogen is initially formed. Associates such as these and their catalytic effect are described in DE-OS Nos. 2,062,288, 2,062,289, 2,117,576 (U.S. Pat. No. 3,758,444), 2,129,198, 2,330,175 and 2,330,211.

According to the invention, organometallic compounds, particularly organotin compounds, may also be used as additional catalysts.

All of the catalysts mentioned above may of course be used in the form of mixtures.

Further representatives of catalysts suitable for use in accordance with the invention and information on the mode of action of the catalysts can be found in Kunststoff-Handbuch, Vol. VII, edited by Vieweg and Hochtlen, Carl-Hanser-Verlag, Munich 1966, for example on pages 96 to 102.

The additional catalysts are generally used in a quantity of up to about 10% by weight, preferably about 0.001 to 10% by weight, based on the total quantity of components B 1. and B 2.

Other auxiliaries and additives which may optionally be used include reaction retarders, for example acid-reacting compounds such as hydrochloric acid or organic acid halides: cell regulators and flameproofing agents; stabilizers against the effects of aging and weather: plasticizers: fungistatic and bacteriostatic agents: and also fillers.

Further examples of surface-active additives and foam stabilizers, cell regulators, reaction retarders, stabilizers, flameproofing agents, plasticizers, dyes, fillers, fungistatic and bacteriostatic agents which may optionally be used in accordance with the invention and information on the use of such additives and their mode of action can be found in Kunststoff-Handbuch, Vol. VII, edited by Vieweg and Hochtlen, Carl-Hanser-Verlag, Munich 1966, for example on pages 103 to 113.

The process according to the invention may be carried out as follows. The reaction components are reacted by the one-shot process, the prepolymer process or the semiprepolymer process, often using machines, for example the type described in U.S. Pat. No. 2,764,565. Information on processing machines which may also be used in accordance with the invention can be found in Kunststoff-Handbuch, Vol. VII, edited by Vieweg and Hochtlen, Carl-Hanser-Verlag, Munich 1966, for example on pages 121 to 205.

It is also possible in accordance with the invention to produce cold-hardening foams (cf. GB-PS No. 1,162,517, DE-OS No. 2,153,086).

Foams may of course also be produced by block foaming or by the laminator process known per se.

According to the invention, the foams are preferably produced by the frothing process, cf for example Kunststoff-Handbuch, Vol. VII, published by Vieweg and Hochtlen, Carl-Hanser-Verlag, Munich 1966, pages 455, 456, 509, 534).

The polyurethane foams obtainable in accordance with the invention may be flexible, semi-rigid and preferably rigid. They are used, for example, for insulating refrigerators and for the production of sprayed-on insulations and overcoats and as one-component foams.

The invention is further illustrated but is not intended to be limited by the following examples in which all parts and percentages are by weight unless otherwise specified.

EXAMPLES

Example 1

Formulation

Polyol component 90 g of a polyether having an OH number of 465 obtained by addition of propylene oxide onto an aqueous sucrose solution, 10 g of a polyether having an OH number of 650 obtained by addition of propylene oxide onto ethylenediamine, 2 g of a siloxane-polyether copolymer as foam stabilizer and 2 g of water.

100 g of this formulation were intensively mixed at room temperature with 4.5 g of a 3:1 mixture of an adduct of $CO_2$ and N-methylethanolamine containing 10% by weight of water and N,N-dimethylaminopropyl formamide, and also 38 g of trichlorofluoromethane. This mixture was foamed with 153 g of crude 4,4'-diisocyanatodiphenylmethane. A rigid polyurethane foam was formed, showing very few "froth bubbles" by comparison with rigid foams produced with dichlorofluoromethane. In addition, the foam showed a very uniform cell pattern, only slight skin formation, good gross density distribution and very good mold filling power.

| Foaming and physical data: | |
|---|---|
| Cream time | 0 to 1 sec. |
| Gel time | 90 sec. |
| Free gross density | 21 kg/m$^3$ |
| Cell pattern | good to very good. |

Example 2

Formulation

Polyol component same as in Example 1

100 g of this formulation were mixed with 3.9 g of a 3:1 mixture of an adduct of N-methylethanolamine and $CO_2$ containing 10% by weight of water and 1-methylimidazole, and also 38 g trichlorotrifluoromethane.

This mixture was foamed with 153 g of crude 4,4'-diisocyanatodiphenylmethane. A rigid polyurethane foam was formed, showing extremely few "froth bubbles" compared with rigid polyurethane foams produced with dichlorodifluoromethane. In addition, the foam showed a very uniform cell pattern, only slight skin formation, good gross density distribution and very good mold filling capacity for a short in-mold time.

| Foaming and Physical data: | |
|---|---|
| Cream time | 0 to 1 sec. |
| Gel time | 100 sec. |
| Free gross density | 21 kg/m$^3$ |
| Cell pattern | good |

Example 3 (Comparison Example)

Formulation 100 parts of the polyol mixture used in Examples 1 and 2

1 part 1-methylimidazole and 38 parts of trichlorofluoromethane were mixed and foamed with 153 parts of crude 4,4'-diisocyanatodiphenylmethane.

A non-frothed rigid polyurethane foam showing a surface skin, average gross density distribution and poor mold filling power was formed.

| Foaming and physical data: | |
|---|---|
| Cream time | 14 sec. |
| Gel time | 115 sec. |
| Free gross density | 23 kg/m$^3$ |
| Cell pattern | average to poor. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a cellular polyurethane which comprises reacting:
   (A) a polyisocyanate with
   (B) an NCO-reactive component comprising
   (1) a compound containing at least one NCO-reactive group and having a molecular weight of 60 to 1999 and a functionality of 2 to 8,
   (2) optionally a compound containing at least one NCO-reactive group and having a molecular weight of 1000 to about 12,000 and a functionality of 2 to 8, in the presence of a homogeneous mixture which comprises, based on 100 parts by weight of B 1. +B 2.,
   (3) about 0.05 to 25 parts by weight of an optionally water-containing adduct of carbon dioxide with an -amine-containing at least one secondary amino group, no primary amino groups, and at least one primary or secondary hydroxyl group provided there are not more primary hydroxyl groups than amino groups, and
   (4) about 0.05 to 25 parts by weight of an amine catalyst, and
   (5) about 0.5 50 parts by weight of monofluorotrichloromethane, optionally in the presence of
   (C) water and/or further inorganic or organic blowing agents, foam stabilizers and other additives usual in the production of cellular polyurethanes.

2. The process of claim 1 wherein component B 3. is prepared by reacting carbon dioxide with an amine at temperatures of about −25° C. to 160° C. in the absence of optionally halogenated aliphatic hydrocarbon solvents, optionally nitrated, halogenated or alkylated aromatic hydrocarbon solvent, lower aliphatic alcohol solvents, acid amide solvents, lactam solvents, and aprotic-polar solvents.

3. The process of claim 1 wherein component B 3. has
   (a) a basic nitrogen content of about 3.5 to 17.5% by weight,
   (b) a hydroxyl group content about 8.5 to 23% by weight, (c) a carbon dioxide content of about 1 to 37% by weight and (d) a water content of 0 to about 15% by weight.

4. The process of claim 1 wherein said polyisocyanate of component A is based on toluene diisocyanate or a phosgenation product of an aniline-formaldehyde condensate.

5. The process of claim 1 wherein component B 1. comprises a polyether containing 3 to 6 hydroxyl groups and having a molecular weight of about 200 to 1000.

6. The process of claim 1 wherein the amine used to prepare component B 3. is N-methyl-2-aminoethanol.

7. The process of claim 1 where reaction is carried out by the frothing method.

8. A homogeneous mixture consisting of (3) about 0.05 to 25 parts by weight of an optionally water-containing adduct of carbon dioxide with an amine containing at least one secondary amino group, no primary amino groups and at least one primary or secondary hydroxyl group provided there are not more primary hydroxyl groups than amino groups, (4) about 0,05 to 25 parts by weight of an amine catalyst and (5) about 0.5 to 50 parts by weight of monofluorotrichloromethane.

9. The homogeneous mixture of claim 8 wherein component B 3. has (a) a basic nitrogen content of about 3.5 to 17.5% by weight, (b) a hydroxyl group content of about 8.5% to 23% by weight, (c) a carbon dioxide content of about 1 to 37% by weight and (d) a water content of 0 to about 15% by weight.

10. The mixture of claim 8 wherein the amine used to prepare component B 3 is N-methyl-2-aminoethanol.

11. The process of claim 1 wherein said amine contains one secondary amino group and one primary or secondary hydroxyl group.

12. The homogeneous mixture of claim 8 wherein said amine contains one secondary amino group and one primary or secondary hydroxyl group.

* * * * *

UNITED STATES PATENT AND TRADEMARK OFFICE
CERTIFICATE OF CORRECTION

PATENT NO. : 4,735,970

DATED : April 5, 1988

INVENTOR(S) : Claus-Dieter Sommerfeld, Werner Rasshofer

It is certified that error appears in the above-identified patent and that said Letters Patent is hereby corrected as shown below:

At column 12, line 2, please correct "DE-SO" to --DE-OS--

At column 14, line 37, please correct "1000" to --2000--

At column 14, line 51, after "0.5", please insert --to--.

Signed and Sealed this

Twenty-eighth Day of November 1989

Attest:

JEFFREY M. SAMUELS

*Attesting Officer*   Acting Commissioner of Patents and Trademarks